United States Patent

[11] 3,616,043

[72] Inventors Ronald C. Anderson;
Donald J. Strittmatter, both of Tucson, Ariz.

[21] Appl. No. 828,085
[22] Filed May 19, 1969
[45] Patented Oct. 26, 1971
[73] Assignee Hughes Aircraft Company
Culver City, Calif.

[54] METHOD OF BONDING A GLASS PRISM TO A METAL
6 Claims, 2 Drawing Figs.

[52] U.S. Cl. .......... 156/311, 156/99, 156/314
[51] Int. Cl. .......... C09j 5/04
[50] Field of Search .......... 156/60, 99, 310, 314, 315, 316, 317, 318, 319, 330, 311; 161/184, 185, 186, 196

[56] References Cited

UNITED STATES PATENTS

| | | | |
|---|---|---|---|
| 2,920,785 | 1/1960 | Veres .......... | 161/196 X |
| 3,283,401 | 11/1966 | Pijls .......... | 156/330 X |

*Primary Examiner*—Samuel Feinberg
*Assistant Examiner*—Stephen C. Bentley
*Attorneys*—James K. Haskell and Allen A. Dicke, Jr.

ABSTRACT: The method of bonding an optical element to a base includes as a first step the bonding of the optical element to a metal support having substantially the same coefficient of expansion as the optical element. The metal support is then bonded to the metal base with an adhesive which cures at low ambient temperatures for allowing alignment of the optical element with respect to the metal base during the curing time of the adhesive between the metal support and the metal base.

PATENTED OCT 26 1971

3,616,043

Ronald C. Anderson,
Donald J. Strittmatter,
INVENTORS.
BY.

ALLEN A. DICKE, Jr.,
AGENT.

METHOD OF BONDING A GLASS PRISM TO A METAL

The invention herein described was made in the course of or under a contract or subcontract thereunder (or grant) with the Department of the Army.

BACKGROUND OF THE INVENTION

This invention relates in general to a method of bonding an optical element to a base and more particularly to an improved method of bonding that provides ease of alignment of the optical element to the base without the use of separate holding and adjusting devices.

One method of securing a glass prism to a metal base is to bond a prism directly to the metal base with a glass-to-metal adhesive such as described in the military specification MIL–A–14443A Notice 1 titled, ADHESIVES: GLASS TO METAL, dated 7 Apr. 1965. However when bonding an optical element such as a glass prism, directly to a metal base, the difference in expansion between the glass and metal base must be minimized to minimize straining and to prevent fracturing of the glass prism or the bond between the prism and the base. Such can occur because at low temperatures the bond is less pliable and even rigid. Metals such as ferrous alloys have been used for a metal base, however ferrous alloys have the disadvantage of added weight over aluminum. Furthermore, when bonding a glass prism directly to a metal base, the bond may be cured at a high temperature under pressure, which makes it difficult to precisely align the glass prism to the metal base. Therefore, in the prior art alignment is accomplished by bonding the glass to the metal base and then adjusting the prism base assembly with relation to the rest of the system in which the prism is used, with adjustments which are in the base or in a separate part of the system.

Another method of securing a glass prism to a metal base is to use mechanical brackets. The use of mechanical brackets requires a relatively short assembly time and the alignment of the prism to the metal base can be easily accomplished. However, the brackets can be complex and give added weight which is undesirable in some applications. Furthermore, the reliability of the mechanical brackets may be unsatisfactory in applications where the glass prism is exposed to shock or vibration.

SUMMARY OF THE INVENTION

Accordingly, it is an object of the present invention to provide a method of bonding an optical element to a metal base that provides for ease of alignment of the bonding an optical element to a metal base that provides for ease of alignment of the optical element to the metal base.

The above and other objects of this invention can be attained by a method in which an optical element is bonded with an appropriate adhesive to a metal support having substantially the same coefficient of expansion as the optical element. The metal support is then bonded to a metal base using an adhesive that cures at about room ambient temperature and allows for ease of alignment. Therefore, the metal support provides a surface for a metal-to-metal bond between the metal support and the metal base, and the optical element can be easily aligned to the metal base. Furthermore, any strain on the optical element or the bond is absorbed by the metal support at low ambient temperatures, for example below 0° F.

Other objects, features and advantages of this invention will become apparent with reference to the following detailed description, taken in conjunction with the accompanying drawings, in which:

DESCRIPTION OF THE PREFERRED EMBODIMENTS

Figure 1:
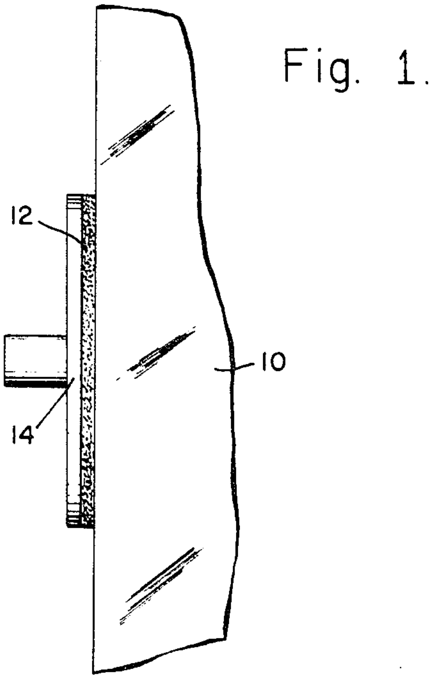
FIG. 1 is a cross-sectional view of a prism bonded to a metal support.

Referring now to the drawings wherein like reference characters designate like or corresponding parts, there is shown in FIG. 1 a glass prism or other optical element 10 bonded to a metal disc or support 14 with a bonding material 12. The metal support 14 can be made of a suitable metal having substantially the same coefficient of expansion as the coefficient of expansion of the glass prism 10. For example, 400 series stainless steel is suitable for most optical glass, and invar is suitable for quartz. The matching of the coefficients of expansion of the glass prism 10 and the metal support 14 prevents strain on the glass prism 10 at low temperatures, below about 0° F. and thus minimizes strain of or prevents fracturing of the glass prism 10 or the bonding material 12.

The bonding material 12 can be any suitable bonding material for bonding glass to metal such as described in the military specification MIL–A–14443, or equivalent, where specific temperature requirements must be met. Military specification MIL–A–14443 provides a bonding which uses a primer and an adhesive. For example, the bonding material 12 can be Normtape 102, Type I, adhesive used with Normco 2102–10% primer which are manufactured by Whittaker Corporation, Normco Materials Division, Costa Mesa, California. The primer can be applied by spraying, brushing, or any suitable means to the prism 10 and a first surface of the bonding support 14. The adhesive is then applied to either the primed surface of the glass prism 10 or the primed surface of the metal support 14 or to both surfaces. The surfaces are then adjoined and allowed to cure under heat and pressure. For example, with the type of adhesive described above, the bond 12 can be exposed to a temperature of 300° F. under a pressure of 25 p.s.i. for a required curing time.

Figure 2:
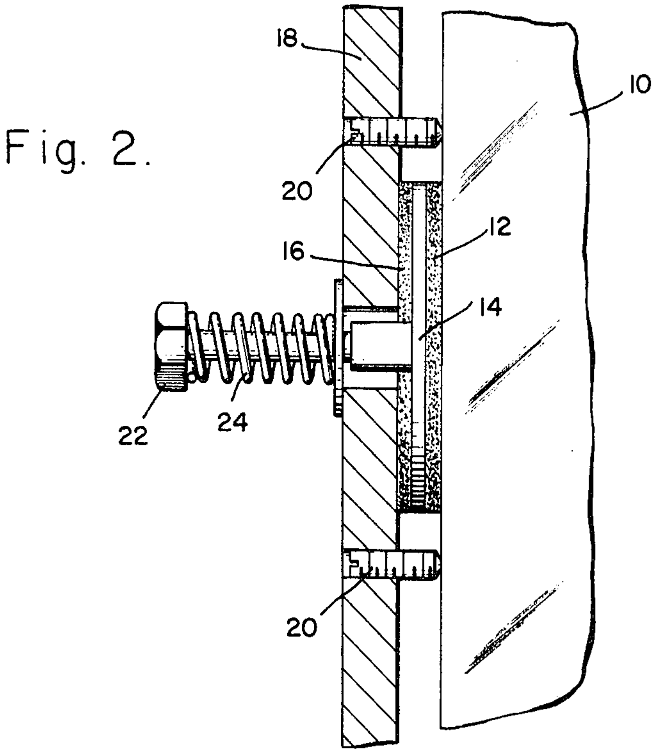
FIG. 2 is a cross-sectional view illustrating a prism bonded through its support to a metal base.

Referring now to FIG. 2, the metal support or disc 14 is shown bonded with a bonding material 16 to a metal base 18 that includes a means for aligning the prism 10 to the metal base 18. The bonding material 16 can be a catalyzed type of bonding material that will cure at a low ambient temperature and will not become brittle or lose strength when exposed to the required temperatures the prism assembly is to be exposed. The use of a bonding material that cures at room ambient temperature allows for ease of alignment between the glass prism 10 and the metal base 18. An adhesive such as a 50/50 mixture of A–12T epoxy, manufactured by ARMSTRONG PRODUCTS CO., Warsaw Indiana, can be used for the bonding material 16. The bonding material 16 can be applied by spraying, brushing, or any suitable method. Furthermore, the metal base 18 and the metal support 14 can be cleaned and primed with a suitable priming material such as described in the Military Specification, MIS–13921. A suitable primer that can be used is Bondmaster M–602 Primer, manufactured by PITTSBURGH PLATE GLASS COMPANY, ADHESIVE PRODUCTS DIVISION, Bloomfield, New Jersey.

An advantage of the above-described bonding method is that the metal support 14 will absorb any difference in the expansion between metal base 18 and the prism 10 when exposed to extreme temperature conditions and reduce strain and prevent fracturing of the prism 10. Accordingly, lightweight metals that have a high coefficient of expansion, such as aluminum, can be used for the metal base 18, which is desirable in many applications.

Another advantage is that the metal support 14 can be bonded to the prism 10 with a bonding material that requires curing at a high temperature under pressure. The metal support 14 also provides a metal surface for a metal-to-metal bond between the metal support 14 and the metal base 18. Accordingly, a metal-to-metal bonding material that cures at room ambient temperature can be used between the metal base 18 and the metal support 14 that allows the prism 10 to be aligned to the metal base 18 during the early period of the curing time of the metal-to-metal bond.

The means of alignment includes a plurality of adjustment screws 20, a compression spring 24 and a holding screw 22. The spring 24 and holding screw 22 are selected to apply sufficient force to hold the glass prism 10 against the adjusting screws 20 and completely support the glass prism 10 with respect to the metal base 18 without the aid of the bonding material 16.

To align the glass prism 10 to the metal base 18, the adjusting screws 20 are first set to provide the desired bond line thickness between the support 14 and the metal base 18 when the glass prism 10 is in place with the support 14. Then the bonding material 16 is applied to the metal base 18, a second surface of the metal support 14, or both. The quantity of adhesive should be only sufficient to fill the bond area without excessive overflow. After the application of the proper quantity of adhesive, the second surface of the metal support 14 is adjoined with the bonding surface of the metal base 18 and the holding screw 22 is adjusted to a desired amount of compression. The prism 10 is then adjusted in a plane parallel with the bond line. The force on the compression spring 24 is increased until the prism 10 is securely forced against the adjustment screws 20. Then the adjustment screws 20 are adjusted for desired angular position of the prism 10 with respect to the metal base 18. The adhesive is then allowed to cure at a room ambient temperature. While the adhesive is still pliable further adjustment can be made if necessary. After the adhesive has cured, the adjusting screws 20, the holding screw 22, and spring 24 can be removed if desired.

While the salient features have been illustrated and described with respect to particular embodiments, it should be readily apparent that modifications can be made within the spirit and scope of the invention.

What is claimed is:

1. The method of bonding an optical element to a metal base having a different thermal coefficient of expansion comprising the steps of:
   bonding the optical element to a metal support having substantially the same thermal coefficient of expansion as the optical element by the application and curing of a thermosetting adhesive which cures at an elevated temperature to form adhesive attachment between the metal support and the optical element; and subsequently,
   attaching the metal support to the metal base by the application of an adhesive which adhesively attaches to the metal support and the metal base without the application of an elevated temperature.

2. The method of claim 1 further including an intermediate adjustment step by which the optical element is adjusted with respect to the metal base prior to the setting of the adhesive between the metal support and the metal base.

3. The method of claim 2 wherein the adjustment step comprises adjusting the optical element with respect to the metal base prior to the application of the adhesive between the metal support and the metal base and maintaining the adjustment by mechanical contact between the optical element and the metal base during setting of the adhesive between the metal support and the metal base.

4. The method of bonding an optical element to a metal base comprising the steps of:
   positioning a first adhesive which is thermosetting at an elevated temperature in adhesive contact to the optical element and a metal support having a thermal coefficient of expansion substantially the same as the thermal coefficient of expansion of the optical element;
   applying heat and pressure onto the first adhesive at a sufficient temperature for a sufficient length of time and a sufficient pressure to cause curing of the first adhesive and adhesive bonding of the optical element to the metal support;
   positioning a second adhesive which cures at a nonelevated temperature in adhesive contact with the metal support and the metal base, and causing bonding between the metal support and the metal base by setting of the second adhesive whereby bonding of the optical element to the metal base is accomplished.

5. The method of claim 4 further including an intermediate adjustment step by which the optical element is adjusted with respect to the metal base after the curing of the first adhesive and prior to the setting of the second adhesive.

6. The method of claim 5 wherein the adjustment step comprises adjusting the optical element with respect to the metal base prior to the application of the second adhesive and maintaining the adjustment by mechanical contact between the optical element and the metal base during setting of the second adhesive.

* * * * *